(12) United States Patent
Kant et al.

(10) Patent No.: US 8,462,770 B2
(45) Date of Patent: Jun. 11, 2013

(54) METHOD AND SYSTEM FOR BYPASSING 3GPP PACKET SWITCHED CORE NETWORK WHEN ACCESSING INTERNET FROM 3GPP UES USING 3GPP RADIO ACCESS NETWORK

(75) Inventors: Nishi Kant, San Jose, CA (US); Ankit Bansal, Bangalore (IN); Heeseon Lim, Cupertino, CA (US)

(73) Assignee: Stoke, Inc., Santa Clara, CA (US)

( * ) Notice: Subject to any disclaimer, the term of this patent is extended or adjusted under 35 U.S.C. 154(b) by 1107 days.

(21) Appl. No.: 12/415,853

(22) Filed: Mar. 31, 2009

(65) Prior Publication Data
US 2010/0027533 A1 Feb. 4, 2010

Related U.S. Application Data

(60) Provisional application No. 61/137,915, filed on Aug. 4, 2008.

(51) Int. Cl.
*H04L 12/66* (2006.01)
(52) U.S. Cl.
USPC .......................... 370/352; 710/316; 379/242
(58) Field of Classification Search
USPC ..................... 370/352, 335; 455/436, 552.1
See application file for complete search history.

(56) References Cited

U.S. PATENT DOCUMENTS

| 2003/0185178 | A1* | 10/2003 | Chitrapu et al. | 370/335 |
| 2006/0258356 | A1* | 11/2006 | Maxwell et al. | 455/436 |
| 2007/0243872 | A1 | 10/2007 | Gallagher et al. | |
| 2009/0017864 | A1* | 1/2009 | Keevill et al. | 455/552.1 |

FOREIGN PATENT DOCUMENTS

| EP | 1667400 A | 6/2006 |
| EP | 1883195 A | 1/2008 |

OTHER PUBLICATIONS

PCT International Search Report for PCT Patent Application No. PCT/US2009/052751, Dec. 17, 2009, 7 Pgs.
PCT Written Opinion of the International Searching Authority for PCT Patent Application No. PCT/US2009/052751, Dec. 17, 2009, 7 Pgs.
PCT International Preliminary Report on Patentability for PCT Patent Application No. PCT/US2009/052751, Feb. 17, 2011, 8 Pgs.

* cited by examiner

*Primary Examiner* — Dang Ton
*Assistant Examiner* — Lionel Preval
(74) *Attorney, Agent, or Firm* — Blakely, Sokoloff, Taylor & Zafman LLP

(57) ABSTRACT

Techniques for bypassing a packet core network for Internet bound traffic from user equipment (UE) via a RAN are described herein. According to one embodiment, it is determined whether a packet of data is destined for the Internet, in response to receiving the packet from a radio network controller (RNC) of a radio access network (RAN). The packet is originated from user equipment (UE) over the RAN. The packet is routed directly to the Internet without sending the packet to an SGSN (serving GPRS support node) of a packet core network, if the packet is destined to the Internet. Other methods and apparatuses are also described.

13 Claims, 6 Drawing Sheets

METHOD AND SYSTEM FOR BYPASSING 3GPP PACKET SWITCHED CORE NETWORK WHEN ACCESSING INTERNET FROM 3GPP UES USING 3GPP RADIO ACCESS NETWORK

RELATED APPLICATIONS

This application claims the priority of U.S. Provisional Patent Application Ser. No. 61/137,915, filed Aug. 4, 2008, which is incorporated by reference herein in its entirety.

FIELD OF THE INVENTION

The present invention relates generally to 3GPP networks (GPRS general packet radio service and its evolution to UMTS and beyond). More particularly, this invention relates to a method for bypassing 3GPP packet core network when accessing Internet from user equipment using a radio access network.

BACKGROUND

The GPRS/UMTS is an evolution of the GSM standard to provide packet switched data services to GSM mobile stations. Packet-switched data services are used for transmitting chunks of data or for data transfers of an intermittent or bursty nature. Typical applications for 3GPP packet service include Internet browsing, wireless e-mail, and credit card processing, etc.

FIG. 1 is a block diagram illustrating typical 3GPP packet architecture. Referring to FIG. 1, user equipment (UE) 101 is communicatively coupled to a radio network controller (RNC) 102 of a radio access network (RAN) 103. In order to access other networks such as Internet 107 and/or operator services node 108, UE 101 has to go through 3GPP packet core network 106. Typically, 3GPP packet core network 106 includes a serving GPRS support node (SGSN) 104 and a gateway GPRS support node (GGSN) 105. These support node SGSN and gateway node GGSN relay communications between a user terminal (or source mobile station) and a destination.

Note that typically, there will be multiple SGSNs associated with a GGSN, multiple RNCs associated with a SGSN, and multiple UEs associated with an RNC in a hierarchical structure (not shown). Thus, when traffic from the UEs increases, the traffic imposed on higher level nodes (e.g., SGSN and/or GGSN) in the hierarchical structure will be exponentially increased.

Based on an analysis of mobile broadband data traffic patterns, a majority of traffic from UEs is Internet bound traffic, which does not benefit from session anchoring in a traditional mobile packet core. Making the Internet bound traffic traverse the SGSN and GGSN uses SGSN/GGSN resources and will add unnecessary delays to the Internet traffic. With the increase in mobile broadband traffic, the built-in hierarchy in the existing architecture results in more investment in SGSNs, GGSNs, and the transmission network from a RAN to a core network without exploiting the nomadic and Internet nature of traffic.

SUMMARY OF THE DESCRIPTION

Techniques for bypassing a packet core network for Internet bound traffic from user equipment (UE) via a RAN are described herein. According to one embodiment, it is determined whether a packet of data is destined for the Internet, in response to receiving the packet from a radio network controller (RNC) of a radio access network (RAN). The packet is originated from the user equipment (UE) over the RAN. The packet is routed directly to the Internet without sending the packet to an SGSN (serving GPRS support node) of the packet core network, if the packet is destined to the Internet.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Techniques for bypassing a 3GPP core network for Internet bound traffic from user equipment (UE) via a RAN are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According certain embodiments of the invention, traffic from a RAN and designated to the Internet are received and routed to the Internet directly without having to go through (e.g., bypassing) certain components such as an SGSN and/or a GGSN of a 3GPP packet core network. In one embodiment, an Internet access point name (APN) offload (IAO) device (also referred to herein as an IAO gateway (IAO-GW) or Internet breakout device) is implemented and located near an Internet point of presence or any other convenient point based on operator's network topology. Although throughout this application the IAO-GW is described as being co-located with an RNC at an edge of a RAN, such an IAO-GW may also be located at other locations. Further, an IAO-GW may be integrated with an RNC or alternatively, an IAO-GW may be integrated with an SGSN.

According to one embodiment, an IAO-GW includes intelligence to distinguish the traffic destined towards operator's services from the traffic that is destined for the Internet. In response, the Internet bound traffic is diverted to an Internet access point (e.g., the nearest Internet access point) while other traffic is allowed to follow its path towards the operator's core network, i.e., to an SGSN of a 3GPP packet core network. As result, since a majority of traffic is Internet bound, access to the 3GPP packet core network and the resource usage of the SGSN and GGSN are significantly reduced.

Figure 1:
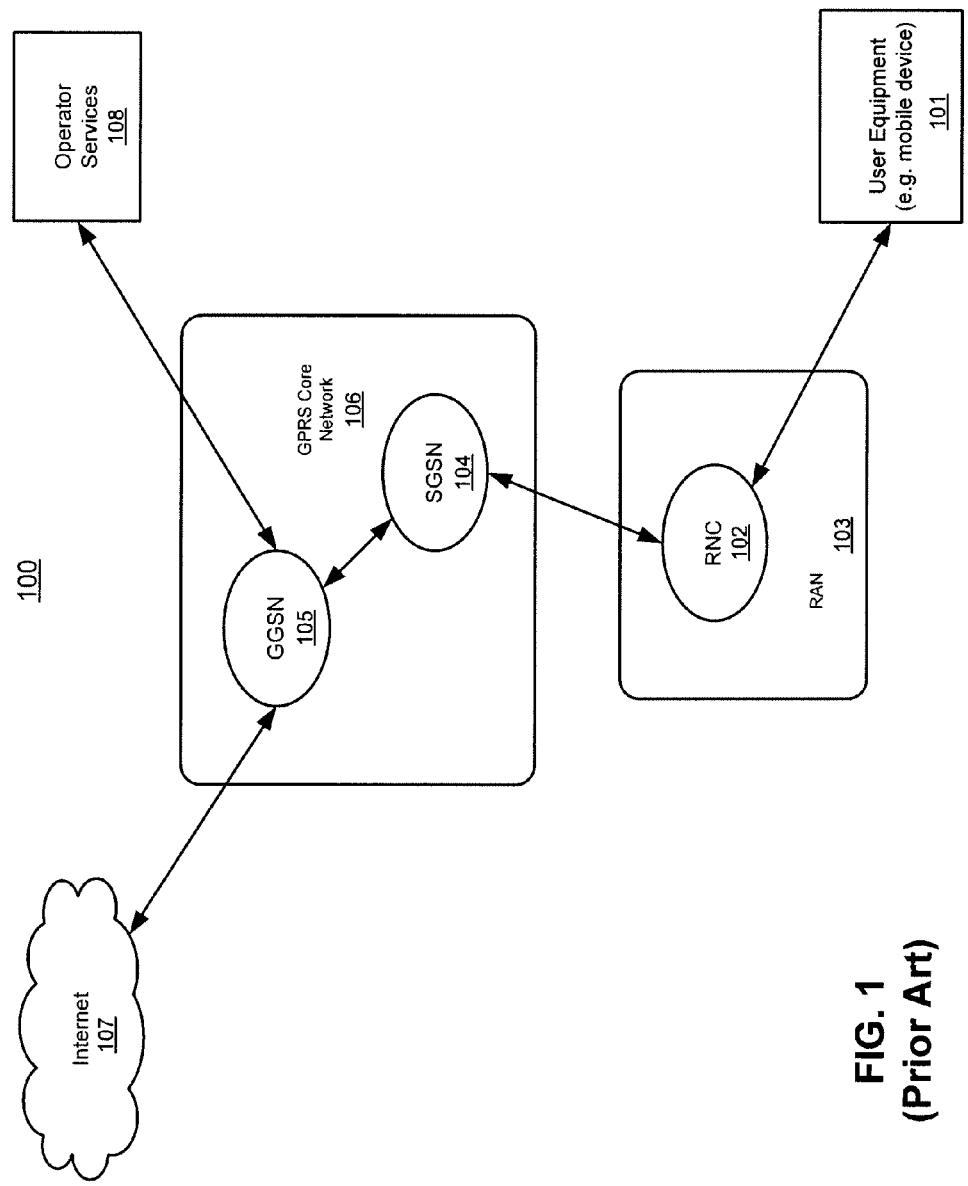
FIG. 1 is a block diagram illustrating a typical 3GPP packet architecture.
Figure 2:
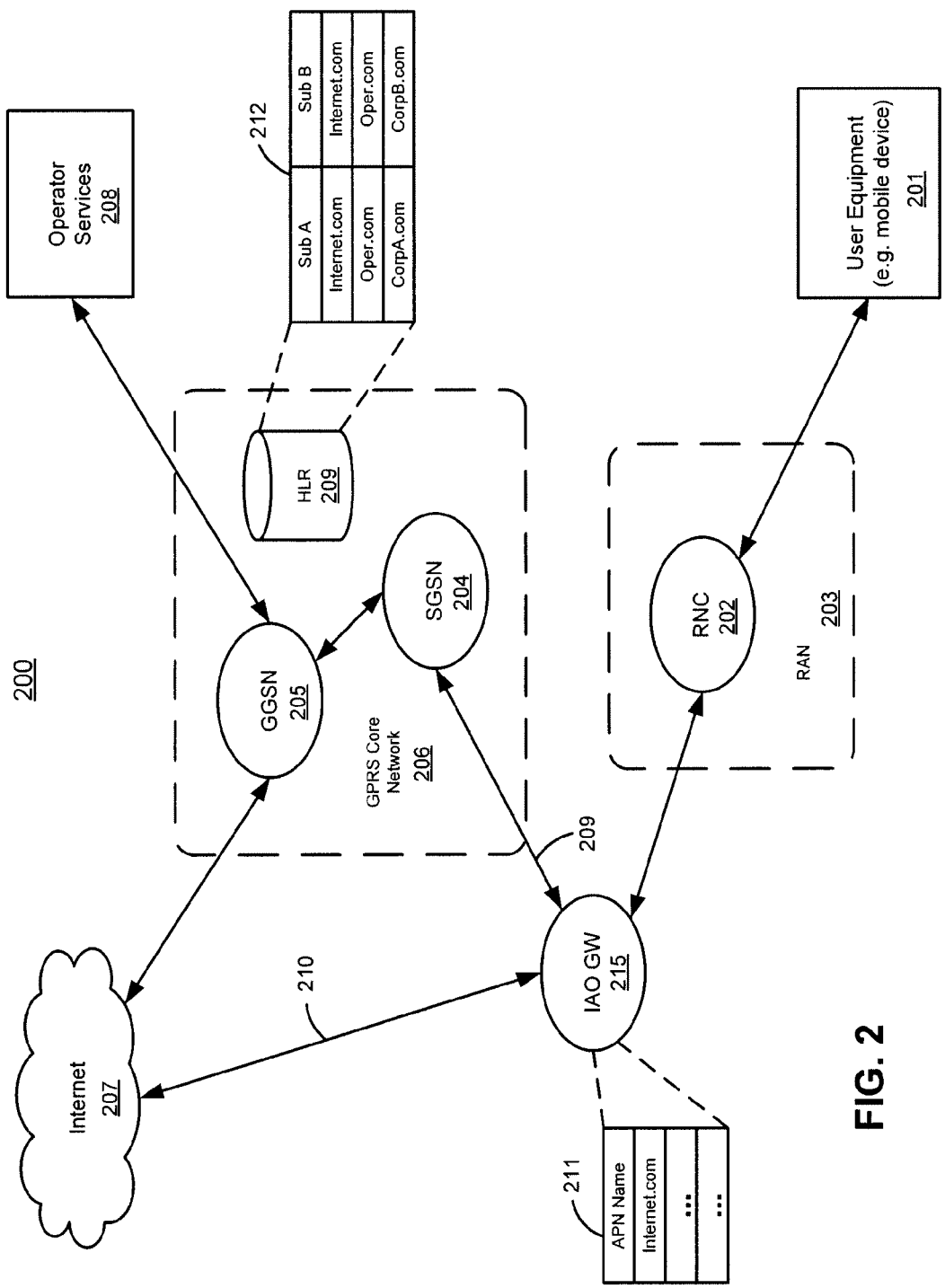
FIG. 2 is a block diagram illustrating a 3GPP packet system according to one embodiment.

FIG. 2 is a block diagram illustrating a 3GPP packet system according to one embodiment. Referring to FIG. 2, similar to FIG. 1, system 200 includes user equipment (UE) 201 communicatively coupled to a radio network controller (RNC) 202 of a radio access network (RAN) 203. In the prior art, in order to access other networks such as Internet 207 and/or operator services node 208, EU 201 has to go through 3GPP packet core network 206. Typically, 3GPP packet core network 206 includes a serving GPRS support node (SGSN) 204, a gateway GPRS support node (GGSN) 205, and a home location register (HLR) 209. These support node SGSN 204 and gateway node GGSN 205 have a function of relaying communication between a user terminal (or source mobile station) and a destination node (e.g. a server in the Internet or another mobile station). Note that again, there may be multiple SGSNs associated with a GGSN, multiple RNCs associated with a SGSN, and multiple UEs associated with an RNC in a hierarchical structure (not shown).

SGSN 204 effects data transmission between UE 201 or GGSN 205. For example, SGSN 204 collects up-link sessions from the RNC 202 and distributes the down-link session delivered from a gateway node GGSN 205 toward RNC 202. The SGSN 204 manages a packet service between SGSN 204 and GGSN 205 by tunneling (GTP-GPRS Tunneling Protocol). SGSN 204 receives the subscriber profile stored in a home location register (HLR) 209 and has therein at any time a copy thereof. The subscriber profile has information about the subscribed services (Internet, operator walled garden etc.)

GGSN 205 functions as a logical interface to an external data packet network such as Internet 107 operator services node 208 and operates for coupling between core network 206 and such external packet data networks 107, 208. More specifically, GGSN 205 collects up-link sessions from SGSN 204 and accesses Internet 107 or operator services 208. GGSN 205 in the 3GPP packet core network 206 sets up a tunnel down to SGSN 204 for down-link sessions.

HLR 209 is a database node for storing subscriber profile including registered location information of the mobile stations, and delivers a copy of the subscriber data to the support node SGSN 204, upon request therefrom. More specifically, HLR 209 stores permanent subscriber data as to each of the mobile subscribers, such as including a mobile station ISDN number (MSISDN) which specifies a proprietary mobile subscription by using a PSTN numbering plan, and an international mobile subscriber identity (IMSI) which is a proprietary identity or ID allocated to each subscriber and used for identification during the signal transmission in the mobile network system.

HLR 209 also stores therein data including the current subscriber location corresponding to the address of VLR (visitor location register). For every mobile subscriber, it stores a list of the services that are allowed to the mobile subscriber.

In addition, according to one embodiment, an IAO-GW 215 is communicatively coupled SGSN 204 of GPRS core network 206 and RNC 202 of RAN 203. For the purpose of illustration, in this example, IAO-GW 215 is implemented between SGSN 204 and RNC 203. However, IAO-GW 215 may also be located in other locations. In one embodiment, IAO-GW 215 is configured to interpret the control traffic flowing between UE/RNC and SGSN. Particularly, IAO-GW 215 is configured to examine the control traffic to determine whether UE 201 is attempting to establish a communication path with the Internet 207 or operator services 208.

If the traffic is for operator's services 208, both the control traffic and the associated data traffic are allowed to reach, via path 209, SGSN 204 for transfer to GGSN 205 in order to reach operator's services 208. In this scenario, the IP address (by which UE 201 is represented to the operator's services 208) is allocated by GGSN 205 and IP routers are configured to route all traffic destined to this IP address to GGSN 205 which in turn tunnels the data to UE 201 via SGSN 204 and RNC 202. Thus, IAO-GW 215 does not interfere with the control traffic that is exchanged between UE 201 and the 3GPP packet core network 206 for registering UE 201 with the network 206, as well as the mutual authentication between UE 201 and network 206.

If it is determined that the traffic is destined for Internet 207, IAW GW 215 directs the traffic to Internet 207 via path 210, bypassing SGSN 204 and/or GGSN 205 of 3GPP packet core network 206. Thus, only the Internet bound traffic will be diverted directly to the Internet 207, while the rest of the traffic will be allowed to enter 3GPP packet core network 206.

In one embodiment, when UE 201 attempts to establish a connection with Internet 207 it sends a request using a predefined APN, and IAO-GW 215 intervenes. Specifically, IAO-GW 215 allows the request to continue to GGSN 205, via SGSN 204. GGSN 205 generates a response and sends it towards UE 201. A response from GGSN 205 contains an IP address allocated by GGSN 205 from its IP address pool by which further traffic will be routed to GGSN 205. In response, IAO-GW 215 replaces this IP address allocated by GGSN 205 with an IP address that is allocated by IAO-GW 215. UE 201 uses this address when sending traffic to Internet 207. As a result, further traffic (to Internet 207) will be routed to IAO-GW 215 bypassing SGSN 204 and GGSN 205 of 3GPP packet core network 206.

According to one embodiment, whether specific Internet bound traffic should be diverted directly to the Internet 207 without going through 3GPP packet core network 206 may be specifically configured, for example, by an administrator. In one embodiment, IAO-GW 215 maintains the configuration information such as a table or database 211 having a list of APNs associated with Internet bound traffic that is be diverted. The APN names may be replicated from information from HLR 209 which typically maintains a table or database 212 regarding information of the subscribers.

Thus, when the Internet bound traffic is received at IAO-GW 215, IAO-GW 215 may examine the traffic to determine whether the associated APN of the traffic is listed in table 211. If the corresponding APN is found in table 211, the traffic will be diverted to Internet 207 bypassing 3GPP packet core network 206. Otherwise, the traffic will be allowed to enter 3GPP packet core network 206. In one embodiment, such a setting can be enabled or disabled dependent upon a specific configuration set by an administrator. For example, the Internet breakout routing of a specific APN may be disabled by removing the corresponding entry from table 211 or alternatively, an attribute associated with the entry may be set to a predetermined value for such an indication. In another embodiment, the breakout routing is set for a predetermined period of time after which the routing is disabled automatically.

Note that throughout this application, a 3G RAN and an RNC are used as an example of an access network and a gateway device. However, the present invention is not limited to use in network with these components. Other configurations may also be applied. For example, RAN 203 may be a femto cell while RNC 202 may be a femto gateway device.

Figure 3:
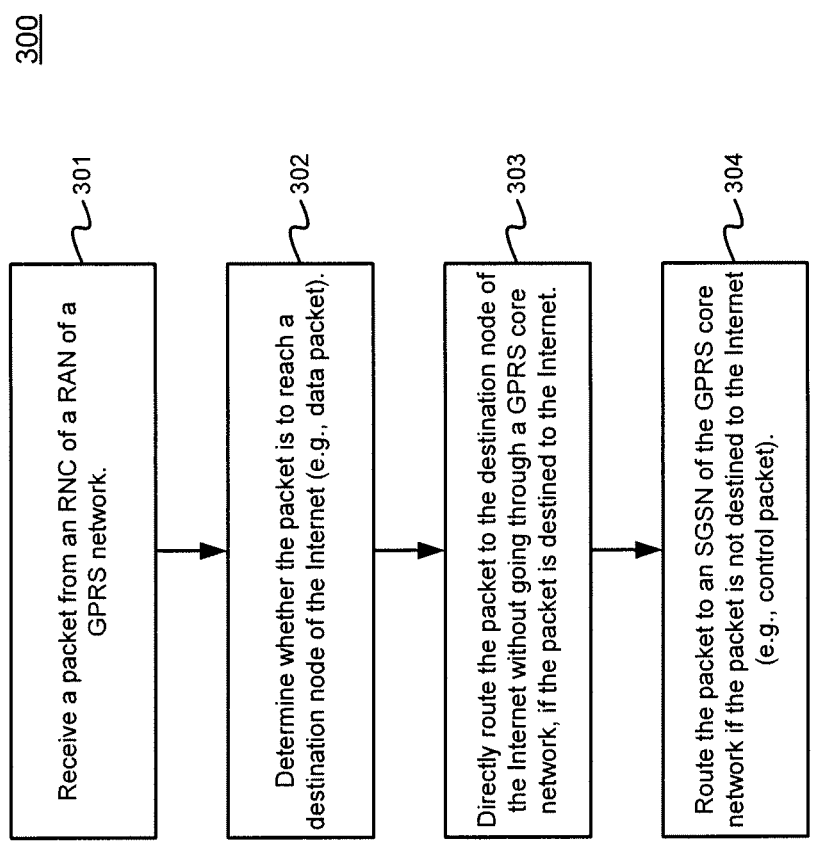
FIG. 3 is a flow diagram illustrating a process for routing 3GPP data packets according to one embodiment of the invention.

FIG. 3 is a flow diagram illustrating a process for routing GPRS data packets according to one embodiment of the invention. Note that process 300 may be performed by processing logic which may include software, hardware, or a combination of both. For example, process 300 may be performed by IAO-GW 215 of FIG. 2.

Referring to FIG. 3, at block 301, a packet is received from an RNC of a RAN of a 3GPP network, where the packet may be initiated from a UE associated with the RNC. At block 302, processing logic determines whether the packet is to reach a destination node of the Internet (e.g., Internet bound traffic). In one embodiment, a packet may be examined based on the combination of protocol, source address, and/or destination address associated with the packet. In one embodiment, the IAO-GW sits in the middle of all the control traffic and is able to identify whether the traffic is Internet bound traffic, i.e. whether the service is Internet bound or not. This decision is based on the APN. When the IAO-GW receives a data packet, it knows if the data packet is Internet bound traffic or not by the destination IP address (and session ID).

If it is determined that the packet is Internet bound, at block 303, the packet is directly routed to the destination node of the Internet without going through the corresponding 3GPP packet core network (e.g., SGSN and GGSN). Otherwise, at block 304, the packet is routed to an SGSN of the 3GPP packet core network as per 3GPP specification. Other operations may also be performed.

Figure 4A:
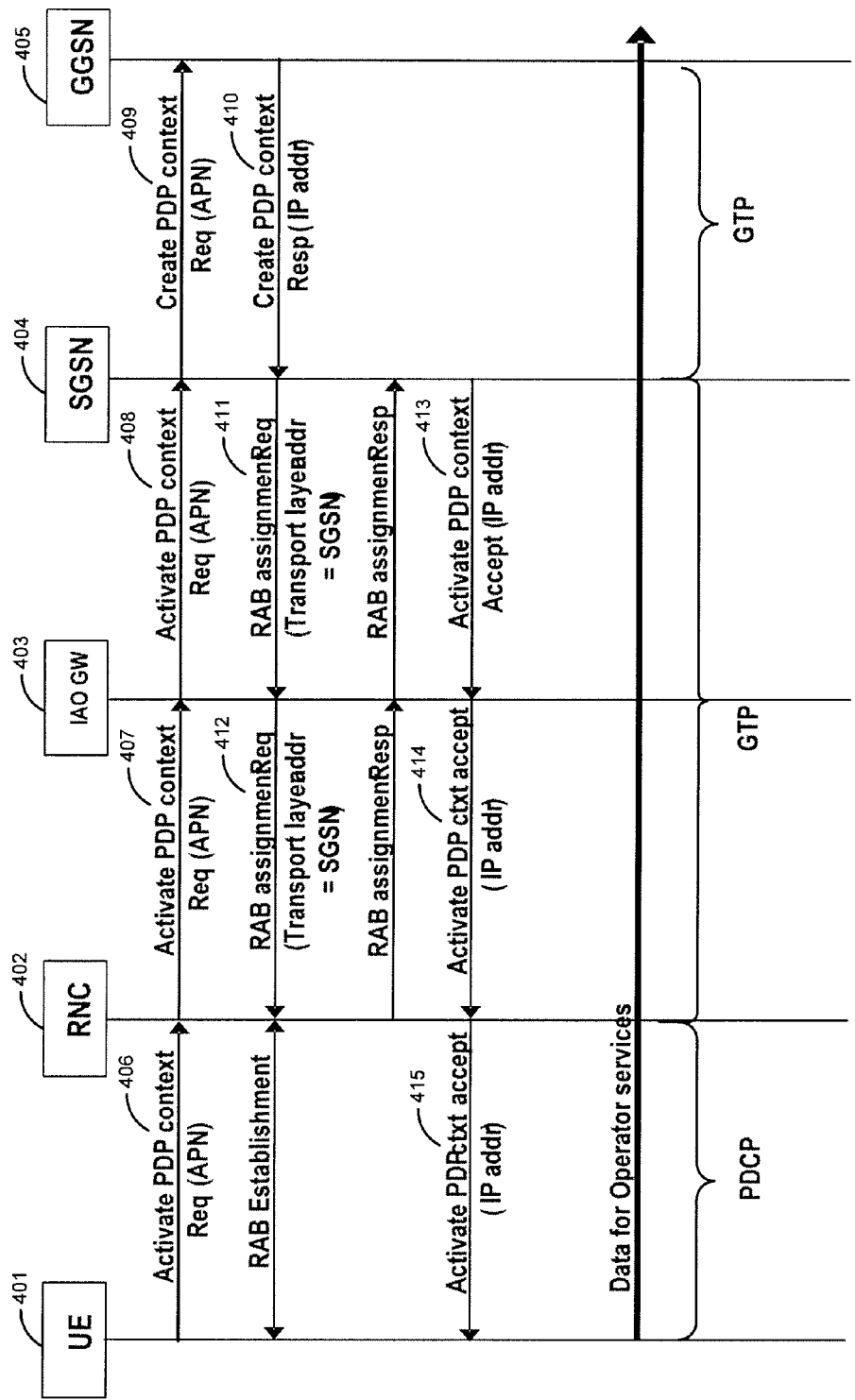
FIG. 4A is a transaction diagram illustrating a processing flow for handling data packets according to one embodiment of the invention.

FIG. 4A is a transaction diagram illustrating a processing flow for handling data packets. In this case, the user requests for operator services (i.e. non-Internet services) and IAO GW does not break out the traffic for the UE and send it directly to the Internet. Instead, traffic from the UE goes through an SGSN and GGSN.

Referring to FIG. 4A, when UE 401 attempts to establish a connection to access a node of an external network such as Internet or operator's services node, UE 401 generates a PDP (packet data protocol) context request that contains an APN and sends the request to RNC 402. PDP context request includes a PDP context which is a data structure present on both the SGSN and the GGSN which contains the subscriber's session information when the subscriber has an active session. When a UE wants to use 3GPP data service, it first attaches and then activate a PDP context. This allocates a PDP context data structure in the SGSN that the subscriber is currently visiting and the GGSN serving the subscribers access point. The data recorded includes information regarding a subscriber's IP address, and subscriber's tunnel endpoint IDs (TEIDs) for SGSN and GGSN. In addition, an access point is selected and an APN is determined.

When IAO-GW 403 receives the PDP context request forwarded from RNC via transactions 406-407, the IAO-GW 403 determine whether such a request is for accessing the Internet by examining the associated APN. The IAO-GW 403 determines the connection to be established is not Internet bound and the associated APN identifies an operator's services or other traffic (e.g. Internet traffic) that an operator decided not to break out at IAO GW. In these cases, IAO-GW 403 marks this session as non-IAO and relays the request without modification to SGSN 404 which sends the request to GGSN 405 via transactions 408-409.

In response to the request, GGSN 405 responds with an allocated IP address appropriate for the requested APN from its IP address pool and sends the response to SGSN 404 via transaction 410. In response the response, SGSN 404 sends a RAB (radio access bearer) assignment request to RNC 402, via IAO-GW 403, having a transport layer address allocated by SGSN 404 via transactions 411-412. During transactions 411-412, again IAO-GW 403 acts merely as a relay device. Once the RAB assignment has been completed, the activation of PDP context is completed via transactions 413-415 using an IP address allocated by GGSN 405.

Thus, the session setup operations are performed during which IAO-GW 403 acts as a relay device. As a result, a GTP tunnel is created between RNC 402 and SGSN 404 and subsequent data for the session is exchanged between RNC 402 and SGSN 404 via the GTP tunnel. That is, all traffic has to go through SGSN 404 and GGSN 405 of the 3GPP packet core network. The IAO-GW 403 simply acts as a delay device.

Figure 4B:
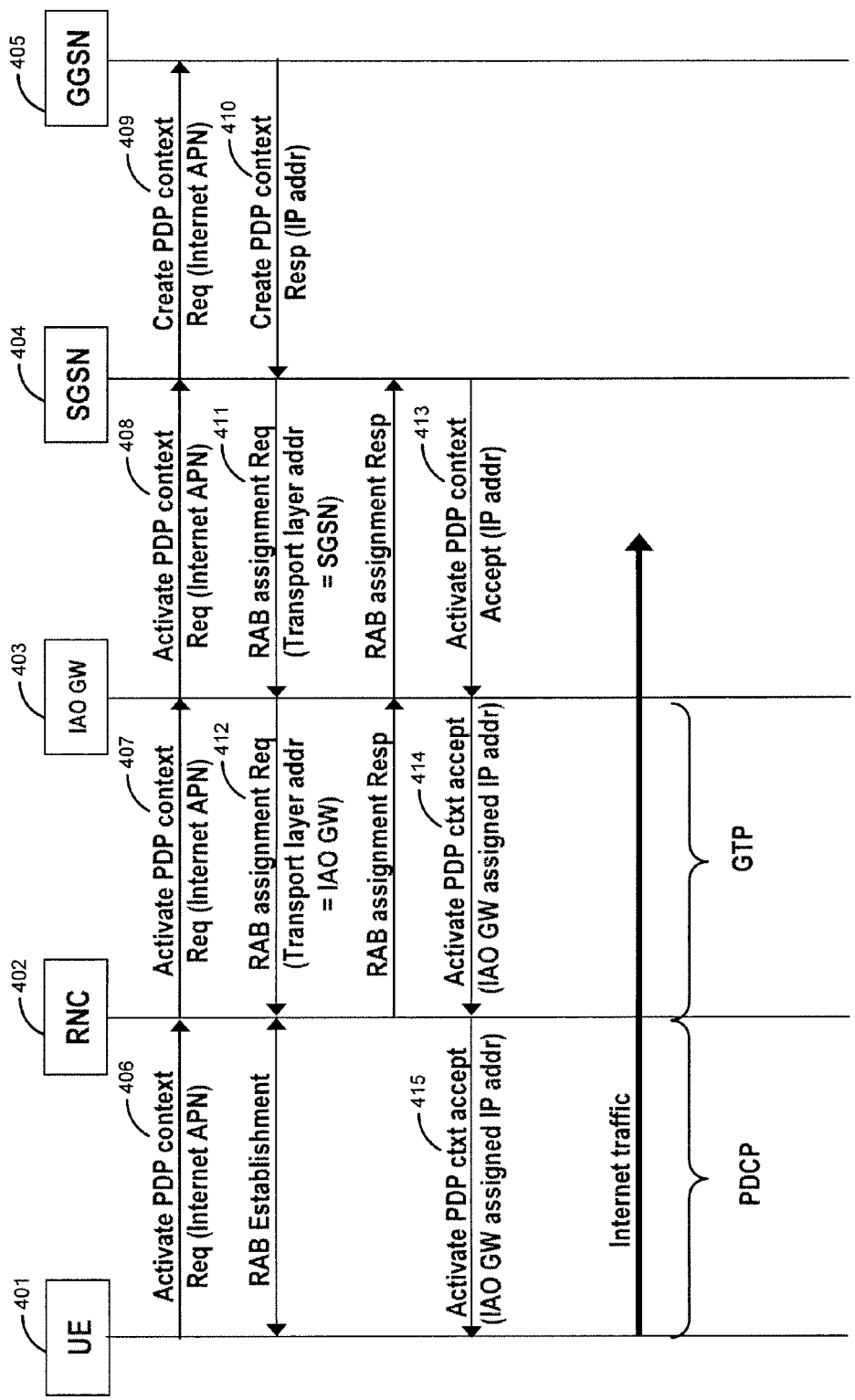
FIG. 4B is a transaction diagram illustrating a processing flow for handling data packets according to an alternative embodiment of the invention.

FIG. 4B is a transaction diagram illustrating a processing flow for handling control packets for IAO case according to an alternative embodiment of the invention. In this embodiment, when UE 401 sends a request to establish a connection and the request is received by IAO-GW 403 via transactions 406-407, similar to the processing flow as shown in FIG. 4A, IAO-GW 403 determines whether the request is for the Internet, for example, by examining the APN associated with the request.

If it is determined that the request is for the Internet, when a request for RAB assignment is received from SGSN 404 via transaction 411, the IAO-GW 403 is configured to replace a transport layer address allocated by SGSN 404 with the one allocated by IAO-GW 403 during transaction 412. This, in effect, separates a control plane SGSN from a user plane SGSN as described in 3GPP specifications. Here, SGSN 404 becomes the control plane SGSN while the IAO-GW 403 becomes the user plane SGSN. In addition, RNC 402 and SGSN 404 do not know this happening and thus, there is no impact on RNC 402 and SGSN 404. As a result, there is no need to change any settings at RNC 402 and SGSN 404.

Similarly, when IAO-GW 403 receives a response from SGSN 404 via transaction 413 that accepts the activation of the PDP context, IAO-GW 403 is configured to replace the IP address allocated by GGSN 405 with an IP address allocated internally by IAO-GW 403 and sends the response to RNC 402. As a result, a GTP tunnel is created between RNC 402 and IAO-GW 403, instead of RNC and SGSN as described in FIG. 4A, and subsequent Internet data for the session is exchanged between RNC 402 and IAO-GW 403. This in effect has the same effect as separating a control plane GGSN from a user plane GGSN. Here GGSN 405 becomes the control plane GGSN while IAO-GW becomes the user plane GGSN that assigns the user IP address. This mechanism is similar to how some GGSNs are implemented for load sharing in a chassis. There is no change needed for RNC 402, SGSN 404, or GGSN 405 under this configuration.

Figure 5:
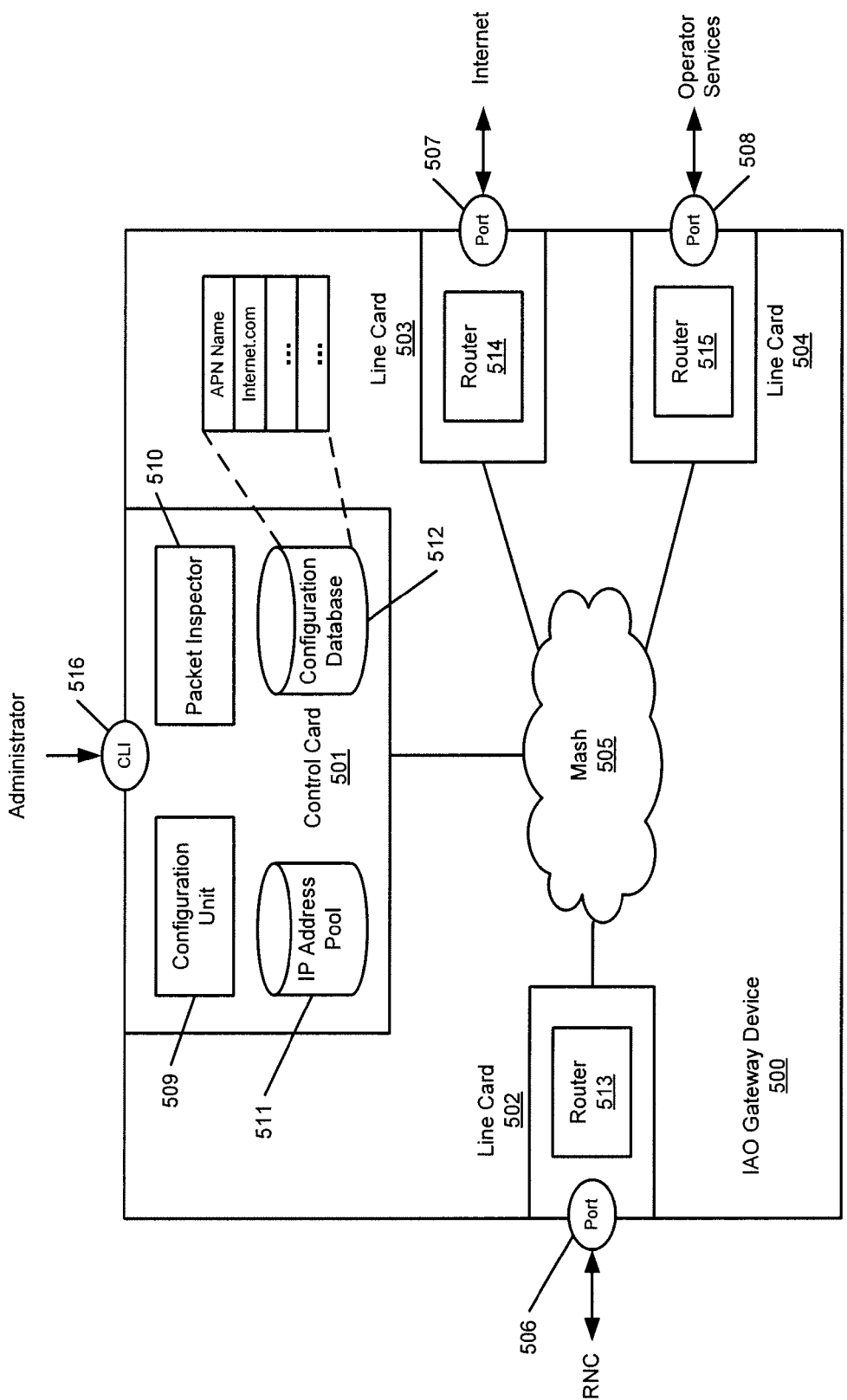
FIG. 5 is a block diagram illustrating an IAO-GW according to one embodiment of the invention.

FIG. 5 is a block diagram illustrating an IAO-GW according to one embodiment of the invention. For example, IAO-GW 500 may be implemented as a part of IAO-GW 215 of FIG. 2. Referring to FIG. 2, IAO-GW 500 includes, but is not limited to, a control card 501 (also referred to as a control plane) communicatively coupled to one or more line cards 502-504 (also referred to as interface cards or user planes) over a mesh 505, which may be a mesh network, an interconnect, a bus, or a combination thereof. Each of the line cards 503-504 is associated with one or more interfaces (also referred to as ports), such as interfaces 506-508 respectively. Each line card includes routing functional block (e.g., blocks 513-515) to route packets via the corresponding interface according to a configuration (e.g., routing table) configured by control card 501. For the purpose of illustration, it is assumed that interface 506 is to be coupled to an RNC of a RAN; interface 507 is to be coupled to the Internet; and interface 508 is to be coupled to SGSN of a 3GPP packet core network for operator services.

According to one embodiment, control card 501 includes a configuration unit 509, a packet inspector 510, an IP address pool database 511, and a configuration database 512. In one embodiment, database 512 is used to store information regarding which APNs of which the traffic should be diverted to the Internet directly bypassing the 3GPP packet core network. As described above, an administrator can configure or specify via a User Interface (e.g. command line interface (CLI)) 516 which APNs for the purpose of Internet breakout. Through User Interface 516, the administrator can also enable and/or disable a specific APN for Internet breakout purposes (e.g., by removing or adding APNs)

Packet inspector 510 is configured to inspect session initiation request control packets to establish a connection to determine whether the traffic is to be Internet bound by comparing the APN values provided in the request and the APNs stored/configured in database 512. If so, the configuration unit 509 may perform a process similar to the one as shown in FIG. 4B, including replacing certain IP addresses from its own IP address pool 511. Based on the configuration set up by control card 501, a packet router functional block of each line card is configured to route the corresponding data packets to the Internet directly, for example, via interface 507, bypassing the 3GPP packet core network. Otherwise, if configuration unit 509 determines that a packet is destined for the 3GPP packet core network, the packet router would route the packet to the 3GPP packet core network, for example, via interface 508.

Note that some of the functionality of control card 501 may be delegated or replicated to a line card. For example, certain information of database 512 may be replicated to line cards 502-504 and stored in a storage location (not shown) within line cards 502-504. Also note that some or all of the components as shown in FIG. 5 may be implemented in hardware, software, or a combination of both.

The solution described above requires only the transport path and the IAO-GW to be configured; other nodes are entirely unaffected. The solution only applies to the APNs that an operator decides to breakout. That is, a specific APN can be specifically enabled or disabled within the IAO-GW by changing the IAO configuration. All other APNs and services are completely unaffected with respect to mobility, charging, and roaming, etc. No change is needed in operations, packet core nodes, routing or user experience (e.g., transparent). The solution described herein can work with any mobile packet core. For APNs that are configured for breakout, most of the user experience and operations remain the same. Most of the mechanisms used in the solution described herein are already standardized by 3GPP. There is no threat to the existing 3GPP mobile network architecture and operations.

The solution described herein also fully supports mobility as it is supported today in 3GPP operator network. The RNC or SGSN, depending on the type of mobility, keeps acting as the control anchor for the mobility, and the mobility is supported transparently to the IAO-GW without any impact to the operators' network.

In addition, outbound roaming is completely unaffected by the solution described herein, since only APNs configured at the IAO-GW are subjected to local breakout. With respect to inbound roaming, if the operator does not want the breakout for in-roamers, roaming APN is not configured at the IAO-GW. Traffic is handled at SGSN as per 3GPP specification and there is no impact on user experience or network operations. If the operator wants local breakout for in-roamers, the corresponding roaming APN is configured within the IAO-GW. The IAO-GW provides local breakout for this APN for the in-roamers. Charging is carried out as per 3GPP roaming practice.

Wildcard APNs are treated the same as the non-Internet breakout APNs and all traffic is relayed to SGSN transparently.

Thus, techniques for bypassing a 3GPP packet core network for Internet bound traffic from user equipment (UE) via a RAN have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine-implemented method for processing network traffic of a packet network, the method comprising:
   determining, at an Internet access offload (IAO) gateway (IAO-GW), whether a packet of data is destined for the Internet, in response to receiving the packet from a radio network controller (RNC) of a radio access network (RAN), the packet originated from a user equipment (UE) of the RAN;
   establishing a GPRS tunneling protocol (GTP) tunnel between the RNC and the IAO-GW such that data exchanged through the GTP tunnel is directly routed to the Internet at IAO-GW without going through the SGSN of the 3GPP packet core network, including
      substituting, via the IAO-GW, a first transport layer address in a radio access bearer (RAB) assignment request received from the SGSN with second transport layer address, the first transport layer address being an IP address of the SGSN and the second transport layer address being an IP address of the IAO-GW, and
      transmitting the RAB assignment request having the second transport layer address to the RNC to complete the RAB assignment for the UE and to create the GTP tunnel between the RNC and the IAO-GW;
   routing the packet directly to the Internet without sending the packet to the SGSN of the packet core network, if the packet is destined to the Internet; and
   routing the packet to the SGSN of the 3GPP packet core network if the packet is not destined for the Internet.

2. The method of claim 1, wherein determining whether the packet is destined for the Internet and routing the packet directly to the Internet without going through the packet core network are performed within the IAO-GW located between the RNC and the SGSN of the packet core network.

3. The method of claim 1, further comprising:
   during establishing the communication session, substituting within the IAO-GW a first IP address in an acceptance message of activating a packet data protocol (PDP) context received from the GGSN via the SGSN with a second IP address, the first IP address being a user application layer IP address allocated by the GGSN and the second IP address being a user application layer IP address allocated by the IAO-GW; and
   transmitting the acceptance message of activating the PDP context having the second IP address to the RNC in order to complete a PDP context creation procedure for the requested service.

4. The method of claim 1, wherein subsequent data traversing the GTP tunnel is routed between the IAO-GW and a corresponding destination associated with the APN specified by the communication session for accessing the Internet without accessing the SGSN or GGSN of the packet core network.

5. The method of claim 3, wherein subsequent data traversing the GTP tunnel is routed between the IAO-GW and a corresponding destination associated with the APN specified by the communication session for accessing the Internet without accessing the SGSN or GGSN of the packet core network.

6. A non-transitory machine-readable storage medium storing instructions therein, which when executed by a processor, cause the processor to perform a method for processing network traffic of a data network, the method comprising:
   determining, at an Internet access offload (IAO) gateway (IAO-GW), whether a packet of data is destined for the Internet, in response to receiving the packet from a radio network controller (RNC) of a radio access network (RAN), the packet originated from a user equipment (UE) of the RAN;
   establishing a GPRS tunneling protocol (GTP) tunnel between the RNC and the IAO-GW such that data exchanged through the GTP tunnel is directly routed with the Internet without going through the SGSN of the packet core network, including
      substituting, via the IAO-GW, a first transport layer address of a radio access bearer (RAB) assignment request received from the SGSN with second transport layer address, the first transport layer address being allocated by the SGSN and the second transport layer address being allocated by the IAO-GW, and
      transmitting the RAB assignment request having the second transport layer address to the RNC to complete the RAB assignment for the UE;
   routing the packet directly to the Internet without sending the packet to the SGSN of the packet core network, if the packet is destined to the Internet; and
   routing the packet to the SGSN of the packet core network if the packet is not destined for the Internet.

7. The machine-readable storage medium of claim 6, wherein determining whether the packet is destined for the Internet and routing the packet directly to the Internet without going through the packet core network are performed within the IAO-GW coupled between the RNC and the SGSN of the 3GPP packet core network.

8. The non-transitory machine-readable storage medium of claim 6, wherein the method further comprises:
   during establishing the communication session, substituting within the IAO-GW a first IP address of an acceptance message of activating a PDP (packet data protocol) context received from the GGSN via the SGSN with a second IP address, the first IP address being allocated by the GGSN and the second IP address being allocated by the IAO-GW; and
   transmitting the acceptance message of activating the PDP context having the second IP address to the RNC in order to create the GTP tunnel between the RNC and the IAO-GW.

9. The non-transitory machine-readable storage medium of claim 6, wherein subsequent data traversing the GTP tunnel is routed between the IAO-GW and a corresponding access point associated with the APN specified by the communication session for accessing the Internet without accessing the SGSN or GGSN of the packet core network.

10. An apparatus, comprising:
    a packet inspector to determine whether a packet of data is destined for the Internet, in response to receiving the packet from a radio network controller (RNC) of a radio access network (RAN), the packet originated from a user equipment (UE) of the RAN, wherein the packet inspector is configured to establish a GPRS tunneling protocol (GTP) tunnel with the RNC, such that data exchanged through the GTP tunnel is directly routed to the Internet without going through the SGSN of the packet core network, wherein establishing the GTP tunnel comprises substituting, via the IAO-GW a first transport layer address of a radio access bearer (RAB) assignment request received from the SGSN with second transport layer address, the first transport layer address being allocated by the SGSN and the second transport layer address being allocated by the IAO-GW, and transmitting the RAB assignment request having the second transport layer address to the RNC to complete the RAB assignment for the UE; and a packet router coupled to the packet inspector to route the packet directly to the Internet without sending the packet to a serving GPRS support node (SGSN) of a packet core network, if it is determined that the packet is destined for the Internet, wherein the packet router is configured to route the packet to the SGSN of the packet core network if the packet is not destined for the Internet.

11. The apparatus of claim 10, further comprising:

a first interface to receive packet from the RNC of the RAN;

a second interface to transmit the packet to the Internet if it is determined that the packet is Internet bound; and a third interface to transmit the packet to the SGSN of the packet core network if it is determined that the packet is not Internet bound.

12. The apparatus of claim 10, further comprising a storage for storing a list of one or more APNs, wherein the packet inspector is configured to compare the APN of the request against the list of one or more APNs, and wherein traffic of the requested APN is diverted to the Internet directly if the requested APN matches one of the listed APNs from the storage.

13. The apparatus of claim 10, further comprising a user interface to allow a user to configure the list of one or more APNs to enable or disable a specific APN for direct Internet access without going through the packet core network.

* * * * *